Sept. 21, 1971 L. SHAW 3,606,752
DRIVE FOR VEHICLE MOUNTED REFRIGERATION SYSTEMS
Filed Dec. 15, 1969 2 Sheets-Sheet 1

Lawrence Shaw,
Inventor
by Lyle G. Trorey,
Agent

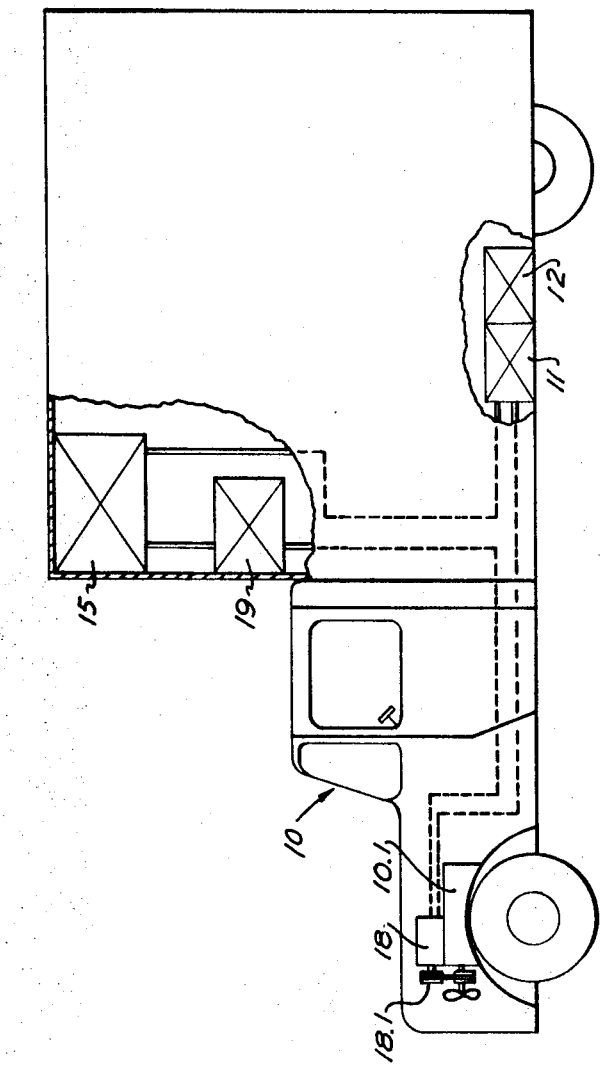

United States Patent Office 3,606,752
Patented Sept. 21, 1971

3,606,752
DRIVE FOR VEHICLE MOUNTED REFRIGERATION SYSTEMS
Lawrence Shaw, Vancouver, British Columbia, Canada, assignor to Fraser Valley Milk Producers Association, Burnaby, British Columbia, Canada
Filed Dec. 15, 1969, Ser. No. 885,019
Int. Cl. F01b 21/00; F25b 27/00, 41/00
U.S. Cl. 60—6
2 Claims

ABSTRACT OF THE DISCLOSURE

A drive arrangement for a vehicle mounted refrigeration system having electrically powered motors connectable to a source of electric power remote from the vehicle, and hydraulically powered motors operated from a vehicle mounted source of power, each arranged for independent operation of the refrigeration system, the hydraulic motors being connected to the electric motors through cam clutches arranged to permit overrunning of the hydraulic motors by the electric motors.

BACKGROUND OF THE INVENTION

Field of the invention

This invention is related to vehicle mounted refrigerating systems and in particular to a drive arrangement therefor.

Prior art

Vehicle mounted refrigeration systems, usually compressor types, include a number of independently driven components such as a compressor, evaporators, and condenser fans. When the vehicle is travelling, power to run the system is usually supplied by the vehicle engine or by an auxiliary internal combustion engine. When the vehicle is stopped for an extended period of time, for instance when it is being loaded or unloaded, it is usually the practice to use an external power source, commonly electrical.

This arrangement permits the vehicle engine to be disconnected from the refrigeration system and, in the case of a tractor-trailer combination, permits the tractor to be disconnected from the trailer so it can be loaded or unloaded while the tractor is used to haul another trailer.

In most refrigeration systems the compressors are driven by power take off drives of the vehicle engine, or by an auxiliary engine. Also, in most refrigeration systems the evaporators are located remote from the compressors, hence driven components and evaporator fans are normally driven by DC electric motors powered from a battery and generator system, or driven by an auxiliary engine. Power available at a loading dock is AC, rectification is thus required to provide DC for DC motors.

In most systems, switching over from road power or vice versa while the refrigeration system is in operation requires controls such as interlocking switches, flow controllers, rectifiers etc., which are costly to install and maintain.

SUMMARY OF THE INVENTION

The present invention provides a drive arrangement for a refrigeration system, the arrangement permitting driven components of the system to be selectively driven hydraulically by a vehicle mounted power source, or electrically from an AC power source remote from the vehicle.

The drive arrangement of the present invention permits switchover from electrical power to hydraulic power and vice versa by simple mechanical means alone without interlocking switches, flow controls, rectifiers, etc., usually found in prior art drive arrangements.

The drive arrangement of the present invention includes at least one electric motor connectable to a source AC of electric power remote from the vehicle, means directly connecting the electric motor to at least one driven component of the refrigeration system, a hydraulic pump connected to a vehicle mounted source of power, at least one hydraulic motor operably connected to the pump, and a cam clutch connecting the hydraulic motor and electric motor arranged to permit the electric motor to overrun the hydraulic motor.

The present invention also includes a plurality of hydraulic motors each connectable to an independently operated driven component of a refrigeration system, the hydraulic motors being operably connected in series to a hydraulic pump.

A detail description following, related to drawings, gives exemplification of preferred embodiment of the invention which, however, is capable of expression by means other than described and illustrated.

DESCRIPTION OF THE DRAWINGS

FIG. 2 illustrates a truck showing generally location of a refrigeration system and the drive arrangement of FIG. 1.

DETAIL DESCRIPTION (FIGS. 1 AND 2)

Figure 1:
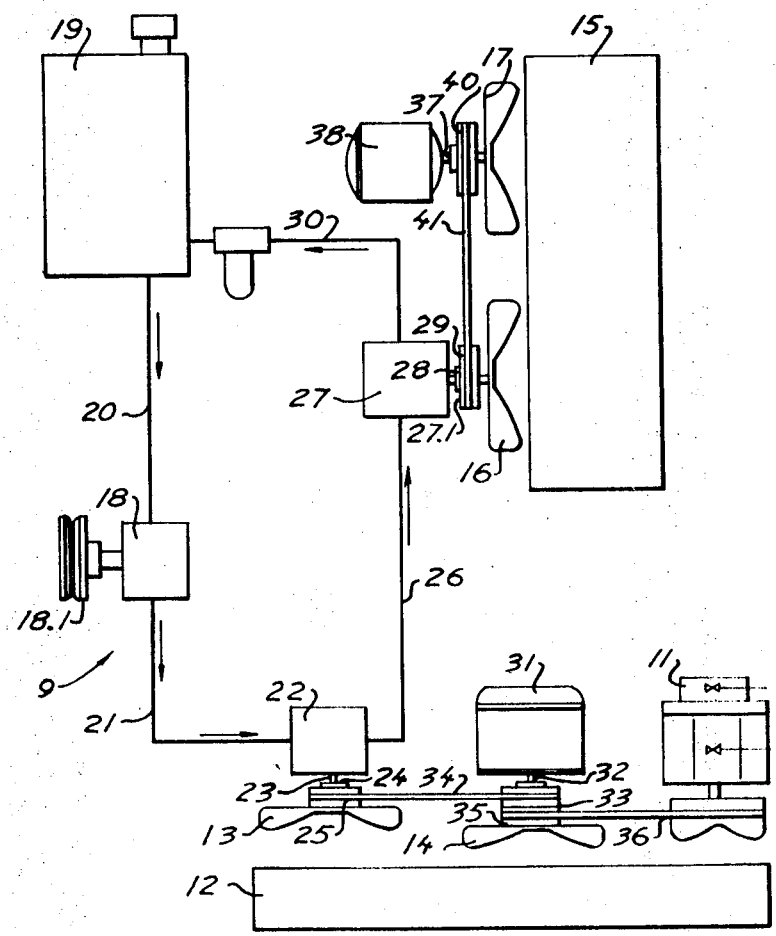
FIG. 1 illustrates, diagrammatically, one embodiment of a drive arrangement in accordance with the present invention.
Figure 3:
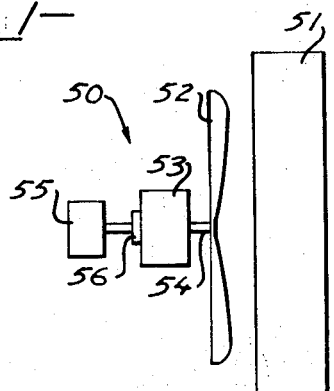
FIG. 3 shown on sheet 1 of the drawings, is a diagrammatic view of another embodiment of a drive arrangement.

Referring to the drawings, FIGS. 1 and 2 show a drive arrangement 9 being one embodiment of the invention, and a typical refrigeration system mounted in a truck 10 having an engine 10.1. The refrigeration system has components including a compressor 11, a condenser 12 having fans 13 and 14, and a remotely located evaporator 15 having fans 16 and 17. The drive arrangement 9 includes a hydraulic pump 18 which is driven from the vehicle engine 10 by a belt and pulley arrangement 18.1, as illustrated. It can also be driven by an auxiliary internal combustion engine, not shown, which can be mounted on the vehicle.

The pump 18 is arranged to draw hydraulic fluid from a tank 19 via a conduit 20, and delivers fluid through a conduit 21 into an intake side of a hydraulic motor 22. The motor 22 is a positive drive type having a drive shaft 23 which is connected, through a cam clutch 24, to a pulley 25 mounted on shaft 23. The fan 13 is connected to a pulley 25 for rotation therewith.

The cam clutch 24 is an overrunning clutch which permits the drive shaft 23 to drive the pulley 25 in one direction, and also permits the pulley 25 to overrun the shaft 23 when the pulley rotates faster than the shaft. As clutches of this nature are well known, cam clutch 24 is not illustrated or described in detail.

An exhaust side of the motor 22 has a fluid connection, via a conduit 26, with an intake side of a hydraulic motor 27 having a drive shaft 27.1. Exhaust fluid from the hydraulic motor 27 passes through the conduit 30 back to the tank 19. The drive shaft 27.1 is connected, through a cam clutch 28 like cam clutch 24, to a pulley 29 on which the fan 16 is mounted. As the hydraulic motors are connected in series to the pump, they are positively linked for synchronous operation since hydraulic fluid is incompressible.

The drive arrangement 9 also includes an AC electric motor 31 having an armature shaft 32 upon which the fan 14 is mounted. The armature shaft 32 has a pulley 33 driving a pulley 25 through a belt 34. The armature shaft 32 is also in direct driven engagement with a compressor 11 via a pulley 35 mounted on the armature shaft 32 driving a belt 36, which in turn drives the compressor.

The drive arrangement 4 also includes an AC electric motor 38 having a drive shaft 37 on which the fan 17 is mounted. A pulley 40 on the shaft 37 is connected by a belt 41 to the pulley 29. Both electric motors are conventionally connectable to a remote AC source, not shown.

Both cam clutches 24 and 28 are so arranged that their associated pulleys 25 and 27, can overrun the drive shafts 23 and 37 when rotated by the electric motors at a speed in excess of the speed of rotation of the drive shafts of the hydraulic motors. Consequently, the electric motors can overrun the hydraulic motors through the cam clutches.

When the refrigeration system is operated by a vehicle engine alone, for instance when the vehicle is travelling, the pump 18 drives both hydraulic motors which, through their associated cam clutches, drive the pulleys 25 and 27 so as to operate the fans 13 and 16. As the pulleys 25 and 29 are directly connected to the electric motors 31, and 38, respectively, the fans 14 and 17, as well as the compressor, are operated as the armatures of the electric motors can free wheel.

When the vehicle reaches a destination, the vehicle operator can connect the electric motors to the nearest available electric power source. When the electric motors are running the pulleys driven by the hydraulic motors overrun their respective drive shafts. Back pressure in the hydraulic motors is avoided. The hydraulic pump 18 can be stopped anytime without damage occurring.

When it is desired again to operate the refrigeration system hydraulically, the vehicle engine or auxiliary engine can run up until the hydraulic motors take the load of the fans and compressors from the electric motors. The electric motors can be then disconnected from the electric power source.

It will be seen that take over from hydraulic power to electrical power and vice versa is automatic. Furthermore the cam clutches avoid use of interlock controls etc. Further, the cam clutches are simple mechanical devices, which can be maintained or replaced by an ordinary mechanic, and the drive arrangement can be maintained and replacements fitted by an ordinary mechanic.

FIG. 2 partially illustrates another embodiment of the invention herein termed drive arrangement 50. In the drive arrangement 50 an evaporator 51 has only one fan 52. An AC motor 53, connectable to a source of electrical power (not shown) remote from the vehicle, has an armature shaft 54 connected directly to the fan 52 driving the latter. A hydraulic motor 55 having a hydraulic connected with a pump, not shown, is connected through a cam clutch 56 to the shaft 54. The cam clutch 56, like the cam clutches 24 and 28, permits the electric motor 53 to overrun the hydraulic motor 55.

Almost invariably the remote power source is 60 Hz. AC. In some rural areas and in some countries DC might be found. In such cases, a common invertor can be provided—or universal motors could be use.

Where the AC source is of frequency other than 60 Hz., obvious drive changes can be made if required.

What is claimed is:

1. A drive arrangment for a vehicle mounted refrigeration system, the system having an evaporator, a compressor, and a condensor and fans at the evaporator and condenser, the drive arrangement including:
    (a) an electric motor connectable in direct driving engagement with the condenser fan and the compressor,
    (b) an electric motor connected in direct driving engagement with the evaporator fan,
    (c) a pair of hydraulic motors connected in series to a source of pressurized hydraulic fluids so that fluid exhausted from one motor drives the other hydraulic motor,
    (d) drive means including cam clutches connecting each hydraulic motor in driving engagement with an electric motor, said cam clutches being adapted to enable the electric motors to overrun the hydraulic motors so that the drive arrangement can, selectively, be operated hydraulically or electrically.

2. A drive arrangement as claimed in claim 1 in which the drive means includes a belt and pulley driving assembly connecting each hydraulic motor to an electric motor, pulleys on the hydraulic motors being driven through cam clutches so that the hydraulic motor pulleys freely rotate when the hydraulic motors are stopped and the electric motors are running.

References Cited

UNITED STATES PATENTS

| | | | |
|---|---|---|---|
| 2,669,098 | 2/1954 | Buell | 60—6X |
| 2,975,614 | 3/1961 | McGuffey | 62—236X |
| 2,986,896 | 6/1961 | Hann | 60—6X |
| 3,477,637 | 11/1969 | Johnson | 62—236X |

MARTIN P. SCHWADRON, Primary Examiner

A. M. OSTRAGER, Assistant Examiner

U.S. Cl. X.R.

62—236